United States Patent [19]

Colombo et al.

[11] Patent Number: 4,459,326

[45] Date of Patent: Jul. 10, 1984

[54] COATING OF SYNTHETIC SURFACES WITH WATER-BASED COATINGS

[75] Inventors: Francesco Colombo; Mark D. Algaier, both of St. Joseph, Mo.

[73] Assignee: Hillyard Enterprises, Inc., St. Joseph, Mo.

[21] Appl. No.: 379,652

[22] Filed: May 19, 1982

[51] Int. Cl.$^3$ .......................... B32B 35/00; B05D 3/02
[52] U.S. Cl. ..................................... 427/140; 427/336; 427/393.6; 427/403; 427/407.1; 427/412.1
[58] Field of Search ................. 427/336, 140, 407.1, 427/412.1, 393.6, 403

[56] References Cited

U.S. PATENT DOCUMENTS 3,772,051 11/1973 Shearing .......................... 427/403 X
3,908,043 9/1975 Evans et al. .................. 427/407.1 X

FOREIGN PATENT DOCUMENTS 208420 12/1955 Australia .

*Primary Examiner*—Thurman K. Page
*Attorney, Agent, or Firm*—Dressler, Goldsmith, Shore, Sutker & Milnamow, Ltd.

[57] ABSTRACT

A method of surface coating a synthetic plastic surface, and particularly of resurfacing an abraded polyurethane plastic surface is disclosed in which the surface is prime coated with an isocyanate-functional polyurethane in solution in an organic solvent medium which is inert to isocyanate functionality. The prime coated surface is dried by allowing the solvent to evaporate thus removing most of the organic solvent, and then the prime coating is overcoated with a water-based organic polymer coating composition. The isocyanate-functional polyurethane is desirably the reaction product of a diisocyanate with a polyether diol which may be used in admixture with a polyol containing 3 or 4 hydroxy groups. The solvent medium is desirably a blend of 75-90% of 1,1,1 trichloroethane with from 5-20% of 2-ethoxy ethanol acetate.

18 Claims, No Drawings

COATING OF SYNTHETIC SURFACES WITH WATER-BASED COATINGS

TECHNICAL FIELD

This invention relates to the coating synthetic plastic surfaces, and particularly to the coating of abraded polyurethane plastic surfaces, such as those used for gymnasium floors, to enable the adherent overcoating of such surfaces with water-based coating compositions. As is known, water based coating compositions are poorly adherent to the plastic surfaces under consideration.

BACKGROUND ART

Gymnasium floors are frequently synthetic plastic surfaces and may be surfaced with one or more polyurethane coatings which abrade in use. In due course these old and abraded surface coatings must be resurfaced. From the standpoint of cost and minimization of solvent fumes, it is desired to achieve the desired resurfacing with water-based organic coatings. While various types of organic coatings are available in aqueous medium and would be useful for the intended purpose, these adhere poorly to the old and abraded polyurethane surface coating which must be overcoated, so these water-based organic coatings cannot be effectively used. It is the objective of this invention to enable the use of such aqueous coatings for the described purpose. It is another objective of this invention to enable the use of aqueous coatings on unabraded synthetic surfaces to provide protection against abrasion for extended periods and to provide for ease of resurfacing, when necessary.

DESCRIPTION OF INVENTION

In accordance with one aspect of this invention, an old and abraded polyurethane plastic surface is resurfaced by applying to the said polyurethane surface an isocyanate-functional polyurethane in solution in an organic solvent medium which is inert to isocyanate functionality. This solution is then allowed to dry to remove most of the organic solvent, and the so-coated and dried polyurethane surface is overcoated with a water-based organic polymer coating composition. Surface renewal after further abrasion damage may be effected by repetition of the overcoating treatment without repeating the application of the isocyanate-functional polyurethane in the organic solvent medium.

Before discussing the features of this invention, it is first desired to discuss the polyurethane, or other, plastic surfaces which are resurfaced in this invention.

The problem which is faced herein primarily relates to the coating of gymnasium floors. These are generally of two types, each of which is installed over a concrete floor. First, one can apply a pigmented base coat, usually of polyurethane character, and then one or more layers of a clear polyurethane coating are applied over the base coat to provide a wear-resistant surface. Second, one can apply a prime coat to the concrete and then overlay the primer with a plastic sheet material, such as a polyvinyl chloride sheet material, which is heated to fuse it to the primed concrete. The plastic sheet contains its own pigmentation and it may then be overcoated with one or more clear polyurethane coatings to provide a wear-resistant surface. When the plastic sheet is not overcoated with a clear polyurethane coating, the surface to which the method of this invention is applied is that of the polyvinyl chloride or other plastic sheet material.

When the outermost layer is a polyurethane surface, it is wear-resistant, but over a period of use, becomes abraded to the point where it is desirable to resurface the old abraded coating. Aqueous coating adhere very poorly to such a surface.

The isocyanate-functional polyurethanes which are used in the solvent solution primer compositions in this invention are subject to wide modification. So long as these possess isocyanate functionality, they will be strongly adherent to the abraded polyurethane substrate, and they will cure by reaction with the moisture in the air.

The preferred isocyanate-functional polyurethanes are made by reacting excess organic diisocyanate (desirably in a 2:1 stoichiometric excess) with polyhydric alcohols to provide an isocyanate-terminated polyurethane of low molecular weight which is soluble in the solvent medium which is used.

In providing the preferred isocyanate-terminated polyurethanes, it is desired to use a mixture of polyhydric alcohols including a diol and a polyol containing at least 3 hydroxyl groups per molecule, especially 3 or 4 hydroxyl groups per molecule as is provided by trimethylol propane or penaerythritol. It is particularly preferred to use a mixture of diol and triol in an equivalent ratio in the range between 2:1 to 1:2, most preferably about 1:1. Best results are obtained when from ⅓ to all of the diol component is a polyether diol having a molecular weight of from 500 to 2,000, illustrated by polypropylene glycol having a molecular weight of 1025.

While any organic solvent medium which is inert to isocyanate functionality and which will vaporize at room temperature can be used, outstanding results are obtained when the solvents are specially blended to contain from 75–90% of 1,1,1 trichloroethane with from 5–20% of 2-ethoxy ethanol acetate. Any organic solvent which is inert with respect to isocyanate functionality may be used in place of, or in addition to, the foregoing preferred solvent system. These other solvents are illustrated by methylene chloride, aromatic hydrocarbons such as xylene or toluene, ketones, such as acetone or methyl ethyl ketone, and ether acetates, such as 2-ethoxy ethanol acetate, and mineral spirits.

As will be evident, isocyanate reacts with water, and water in the atmosphere helps to cure the applied isocyanate-functional coatings. Of course, the coatings must be water-free or any water contained therein must be tied up to prevent reaction, and this is well-known.

The concentration of the isocyanate-functional polyurethane in the solvent system can vary from about 1–50%, but it is preferred to use a concentration of from 4–25%.

All proportions herein are by weight unless otherwise stated.

Two particularly preferred solvent systems contain 1,1,1 trichloroethane and 2-ethoxy ethanol acetate in a weight ratio of 85.5 to 9.5 and a weight ratio of 80.7 to 14.3.

The water based coatings which may be used for the topcoat are conventional. Acrylic copolymers dispersed in water with a volatile base (by salt formation with carboxyl groups in the copolymer) or formed by aqueous emulsion copolymerization are both useful, as are hydroxy-functional acrylic copolymers which have been reacted with polyisocyanates to form polyurethanes. Acrylic copolymers containing large proportions of acrylonitrile are also suitable as well as polyvinyl chloride emulsions and acrylic copolymers containing carboxyl groups which have been cross-linked with polyvalent metals. These can be used alone or in admixture with one another; and polyethylene wax and/or alkali soluble resins may also be desirably added to these water coatings. Mixtures of acrylic emulsion copolymers with polyethylene wax and carboxyl copolymers solubilized with ammonia are illustrative. These may include small amounts of high boiling solvents which aid coalescence of emulsified particles and/or plasticizers to facilitate film formation, as is conventional in floor polishes. Aqueous urethane colloidal dispersions may be present in these aqueous mixtures.

While the aqueous coating is subject to wide variation in accordance with this invention, it is particularly advantageous to use a water-based urethane coating composition of the type disclosed in U.S. Pat. No. 4,278,578, issued July 14, 1981, in which a carboxy functional urethane polymer and a carboxy functional acrylic copolymer are combined with about 1-10% of a base-solubilized carboxy copolymer and cross-linked by about 0.2-3% of a polyfunctional aziridine which may be added to the water coating shortly prior to its use.

The invention will be illustrated using the two-component coating system described in Example 1 of said U.S. Pat. No. 4,278,578.

EXAMPLE

A series of isocyanate-functional resins are prepared as shown below.

| 1a. | Polypropylene glycol (PPG 1025) | 1 |
| b. | 1,3 butylene glycol | 1 |
| c. | Trimethylol propane | 2 |
| d. | Toluene diisocyanate* | 8 |
| 2a. | Polypropylene glycol (PPG 1025) | 2 |
| b. | Trimethylol propane | 2 |
| c. | Toluene diisocyanate* | 8 |
| 3a. | Polypropylene glycol (PPG 1025) | 1 |
| b. | 1,3 butylene glycol | 1 |
| c. | Trimethylol propane | 2 |
| d. | Diphenylmethane-4,4 diisocyanate | 8 |

*The commercially-available 80/20 mixture of the 2, 4 and 2, 6 isomers is used.

Each of the above compositions 1, 2 and 3 is cut with the two mixtures of solvents previously identified to provide useful primer solutions in accordance with this invention. These are applied to abraded gymnasium floors by brush, roller, lambswool, or spray at 5% and 20% resin solids content and dried for from ½-4 hours and then overcoated with the water dispersed coating of Example 1 of U.S. Pat. No. 4,278,578. Excellent adhesion is obtained and a fresh, durable, wear-resistant surface is provided. This surface can be renewed by applying only the aqueous topcoat, so the reapplication of a solvent-containing system is avoided, and this is a valuable economy.

The method of this invention has been described primarily with respect to the resurfacing of abraded polyurethane surfaces. The method may also be applied to unabraded polyurethane surfaces to provide a protective coating which is resistant to abrasion and which is easily resurfaced, when necessary, by the application of a water-based organic coating material. The method may also be applied to synthetic plastic surfaces other than polyurethane surfaces, such as polyvinyl chloride sheet material which has not been overcoated with a polyurethane layer.

What is claimed is:

1. A method of surface coating a synthetic plastic surface comprising applying to said surface a coating of a water-free isocyanate-functional polyurethane in solution in an organic solvent medium which is inert to isocyanate functionality, allowing solvent evaporation to dry said coating by removing most of the organic solvent, and then overcoating the coated and dried polyurethane coating with a water-based organic polymer coating composition.

2. A method of resurfacing an abraded polyurethane plastic surface comprising applying to said abraded surface a coating of an isocyanate-functional polyurethane in solution in a water-free organic solvent medium which is inert to isocyanate functionality, allowing solvent evaporation to dry said coating by removing most of the organic solvent, and then overcoating the coated and dried polyurethane coating with a water-based organic polymer coating composition.

3. A method as recited in claim 1 in which said isocyanate-functional polyurethane is the solvent-soluble reaction product of excess organic diisocyanate with polyhydric alcohol.

4. A method as recited in claim 3 in which said diisocyanate is used in a 2:1 equivalent excess.

5. A method as recited in claim 3 in which said polyhydric alcohol comprises a polyether diol having a molecular weight of from 500 to 2,000.

6. A method as recited in claim 3 in which said polyhydric alcohol further comprises a polyol containing at least 3 hydroxyl groups.

7. A method as recited in claim 5 in which said polyol contains 3 or 4 hydroxyl groups.

8. A method as recited in claim 5 in which said polyol is trimethylol propane.

9. A method as recited in claim 8 in which said polyhydric alcohol component is a mixture of diol and triol in an equivalent ratio of 2:1 to 1:2.

10. A method as recited in claim 9 in which said diol is polypropylene glycol.

11. A method as recited in claim 1 in which said solvent medium is a blend of 75-90% of 1,1,1 trichloroethane with from 5-20% of 2-ethoxy ethanol acetate, up to about 10% of other isocyanate-inert solvents being permissibly present.

12. A method as recited in claim 1 in which the water based organic polymer coating composition is a combination of a carboxy functional urethane polymer and a carboxy functional acrylic polymer with 1-10% of a base-solubilized carboxy copolymer and cross-linked by about 0.2-3% of a polyfunctional aziridine.

13. A method as recited in claim 1 in which the water based organic polymer coating composition is an acrylic copolymer dispersed in water with a volatile base.

14. A method as recited in claim 1 in which the water based organic polymer coating composition is an an acrylic copolymer formed by aqueous emulsion polymerization.

15. A method as recited in claim 1 in which the water based organic polymer coating composition is a polyurethane formed by reaction of a hydroxy-functional acrylic copolymer with a polyisocyanate.

16. A method as recited in claim 1 in which the water based organic polymer coating composition is an acrylic copolymer containing a large proportion of acrylonitrile.

17. A method as recited in claim 1 in which the water based organic polymer coating composition is a polyvinyl chloride emulsion.

18. A method as recited in claim 1 in which the water based organic polymer coating composition is an acrylic copolymer containing carboxyl groups which have been cross-linked with polyvalent metals.

* * * * *